March 8, 1927.
G. CLAUDE
PROCESS FOR THE SEPARATION OF THE CONSTITUENTS OF GASEOUS
MIXTURES SUCH AS THOSE CONTAINING HYDROGEN
Filed March 12, 1923
1,620,192
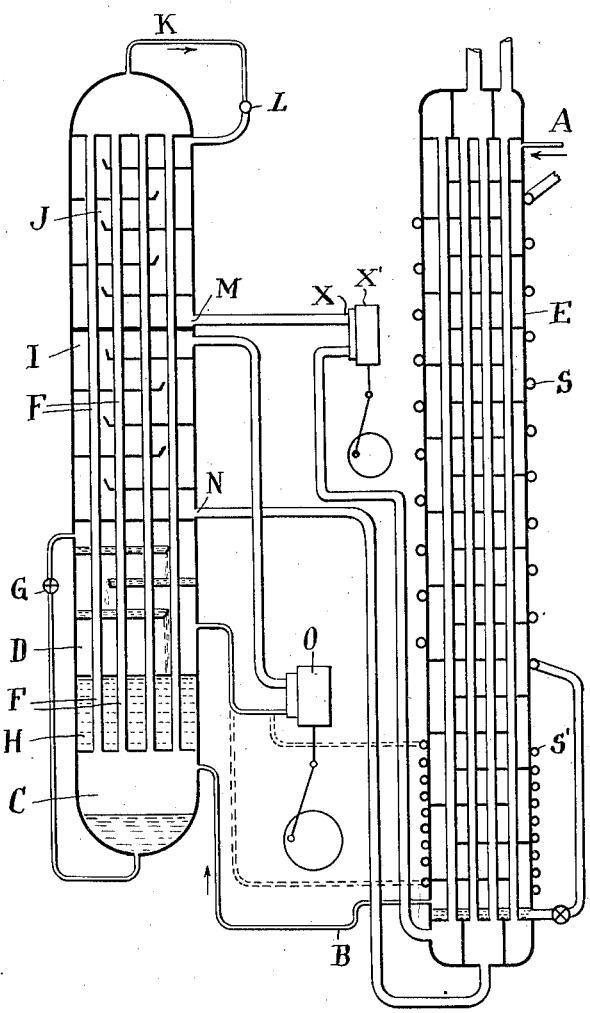
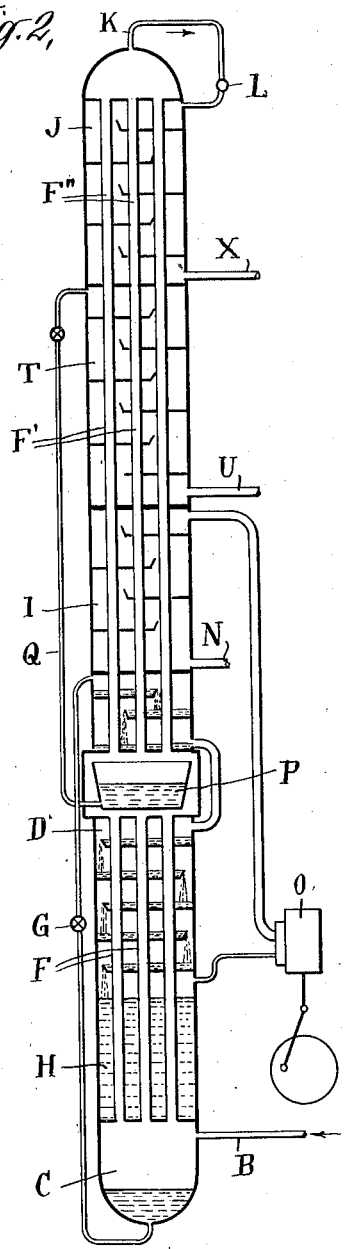
INVENTOR
Georges Claude
BY
Pennie Davis Marvin & Edmonds
his ATTORNEYS Patented Mar. 8, 1927.

1,620,192

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

PROCESS FOR THE SEPARATION OF THE CONSTITUENTS OF GASEOUS MIXTURES SUCH AS THOSE CONTAINING HYDROGEN.

Application filed March 12, 1923, Serial No. 624,668, and in France April 4, 1922.

This invention relates to the separation of gaseous mixtures such as those containing hydrogen, for instance for the manufacture of hydrogen by partial liquefaction of mixtures of gases containing the same such as water gas, ordinary illuminating gas, coke oven gases or the like.

In accordance with the methods described in certain of my prior patent specifications, and especially in the U. S. Patent No. 1,511,800, the expansion with external work of the compressed hydrogen issuing from the top of the nest of tubes of the liquefaction apparatus is relied upon for the production at one and the same time both of the very low temperature required for the practically complete elimination of the carbon-mon-oxide and of the cold necessary for compensating the heat losses of the system. The practical realization of this expansion, owing to the very low temperature (about —200° C. to —210° C.) at which it must be effected, presents certain difficulties which, in accordance with the method described in the specification referred to above, have been overcome by the use of liquid nitrogen as a lubricating agent.

The present invention contemplates the employment, at least in part, of a quite different means for the production of the cold required for the maintenance of the operation of the apparatus.

According to the present invention the separation of the constituents of gaseous mixtures such as those containing hydrogen, for instance for the manufacture of hydrogen by liquefaction of all gases except hydrogen is effected by a process in which the vaporization of the liquefied portion or portions separated from the gases under treatment is carried out under a pressure intermediate between the liquefaction pressure and atmospheric pressure, the gases produced by this or these vaporizations are expanded with production of external work and the cold thus produced is used for the partial liquefaction at a temperature lower than that of the respective vaporizations, the hydrogen obtained being submitted to an expansion with or without external work, the expansion of the hydrogen being dispensed with in the case when the gases to be treated are fed to the liquefaction apparatus at a sufficient pressure. Instead therefore of vaporizing the liquefied part of the gaseous mixture, at a pressure in the neighbourhood of the atmospheric pressure as is done for instance in the case of the process described in the specification mentioned above, the said vaporization is effected under a pressure lower than the liquefaction pressure, but still sufficient to allow vaporized gases, suitably re-heated if need be, to expand with the production of useful external work in a suitable motor. This expansion, which takes place at a relatively low pressure, at a temperature which is relatively only moderately low and in a motor well lubricated by the liquefaction of carbon-mon-oxide and methane, does not present any serious difficulties. The compressed hydrogen, on the other hand, furnishes by its expansion with or without external work besides supplementary quantities of cold, the very low temperature necessary for good condensation of the carbon-mon-oxide and nitrogen. In the case of the expansion without external work of this hydrogen all the special difficulties of an expansion at a very low temperature are avoided.

In order that the invention may be clearly understood and readily carried into effect the same will now be more fully described with reference to the accompanying drawings, in which:—

Figure 1 illustrates by way of example a method of carrying out the invention, applicable more especially to the case of water-gas, and Figure 2 illustrates also by way of example a method of carrying out the invention especially applicable to ordinary illuminating gas or coke oven gases.

Referring firstly to Figure 1 the compressed gases to be treated, after having been dried, and freed from carbon-di-oxide and sulphur compounds are admitted through A into the exchanger E where their other solidifiable constituents are extracted as described in the specification of my co-pending application No. 624,669, filed March 12, 1923. From E the cooled gases pass through B into the collector C. These gases then ascend into the nest of tubes F where they traverse a primary compartment D provided if required at its upper part with some plates and where there is maintained, under a pressure of some atmospheres, some liquid carbon-mon-oxide H. Under the influence of this liquid the carbon-mon-oxide contained in the gases ascending in F which are at a higher pressure becomes partly liquefied, and flows back again into C, whence it is sent through the valve G which reduces its pressure to the intermediate pressure of the boiling liquid H to replace that which evaporates, whilst the gases which are vaporized, re-heated if necessary by circulating them through the coil S' round the exchanger E as shown by the path indicated in dotted lines, are expanded in O up to about the pressure of the atmosphere. The temperature conditions realized should be such that an appreciable liquefaction of carbon mon-oxide is effected at the end of each expansion. The mixture of gas and liquid at atmospheric pressure this obtained is delivered on to the plates of the second compartment I of the vaporizer, where it creates a colder zone than that of D, so that a fresh portion of the carbon-mon-oxide of the ascending gases becomes liquefied and is added to the liquid collected in C. The gases ascending through F then enter the third compartment J where, as will be explained, they are subjected to a still lower temperature, under the effect of which the last quantities of carbon mon-oxide are eliminated.

It is, therefore, pure hydrogen under pressure which passes out at K and it is this hydrogen which, after being expanded at L is sent back round the nest of tubes F in the compartment J which is provided with baffles and there creates the very low temperature of which mention has just been made. This expansion may be carried out with or without external work.

The expanded hydrogen, on leaving the compartment J, is delivered through the outlet M and pipe X to the exchanger E. If the expansion at L is effected without external work, it may be carried out not quite up to the atmospheric pressure, whilst an expansion effected at X with complementary external work, having no longer to be accomplished at the lowest temperature of the cycle, is easy to realize. The expanded carbon-mon-oxide, which has circulated in the compartment I, is in its turn delivered through N to the exchanger E.

Referring now to Figure 2 it is also assumed in this case that the compressed gases to be treated such as ordinary illuminating gas or coke oven gases have been previously purified and cooled by the process described in the specification of my co-pending patent application Serial No. 624,669.

The cold non-liquefied gases, issuing from the temperature exchanger which constitutes the purifier as described in the specification just mentioned, are admitted through B into the collector C of the first nest of tubes F, and ascend in these tubes through the first compartment D of the vaporizer, containing at H methane boiling under a pressure of some atmospheres. Some methane and a little carbon-mon-oxide of the ascending gases become liquefied in the interior of the tubes F in quantity corresponding to the evaporation in the compartment D and, passing through the valve G on to the plates of the compartment D, replace the external liquid in proportion to its evaporation. The methane vaporized under pressure is sent to expand in the motor O, if necessary after re-heating it round the exchanger by a device similar to that shown in dotted lines in Figure 1. The mixture of gas and liquid at atmospheric pressure resulting from this expansion is delivered on to the plates of the second compartment I of the vaporizer, becomes vaporized there, and then passes through N towards the temperature exchanger. This circulation in the compartment I effects in the ascending gases on their reaching the second nest of tubes F', the condensation of a fresh and more volatile portion of their constituents. The liquids thus obtained are collected in P, and delivered by the pipe Q, provided with a valve, to the third compartment T of the vaporizer where they produce another and still colder zone where a fresh portion of the impurities is condensed. The gases vaporized in T, composed essentially of carbon-mon-oxide and nitrogen, pass through U to the temperature exchanger either together with the methane or separately. If necessary use could be made of the action of the expansion with external work of the gases vaporized for this purpose under pressure in T, as has been described in connection with the gases from D.

The gases ascending from the nest of tubes F' then pass through a final portion F" of the nest of tubes where they are subjected to the action of a still lower temperature which completes their purification. The resulting hydrogen, which is expanded at L, with or without external work, and which is returned into the compartment J to circulate round the tubes F'", produces this very low temperature. If the expansion at L is effected without external work, it may be brought not quite down to the atmospheric pressure, and it is completed in X by an expansion with external work in an expansion engine X'.

By the employment, in one or other of the methods which have just been described, of gases compressed to a sufficient pressure, the quantity of cold produced by the expansion with external work of the liquefied gases which are vaporized can suffice by itself alone to ensure the thermic balance, and under this high pressure the temperature furnished by that part of the gases which is evaporated under about the atmospheric pressure is sufficient to ensure solely by itself a high degree of purity of the hydrogen. In this case, consequently, an expansion of the compressed hydrogen could be dispensed with and it could be collected and compressed under its initial pressure.

Claims:

1. A process for the separation of the constituents of gaseous mixtures such as those containing hydrogen by liquefaction of all gases except hydrogen, in which process the vaporization of the liquefied portion or portions separated from the gaseous mixture is carried out under a pressure intermediate between the liquefaction pressure and atmospheric pressure, the gases produced by this or these vaporizations are expanded with production of external work and the cold thus produced is used for the partial liquefaction of the gaseous mixture at a temperature lower than that of the respective vaporizations, the hydrogen obtained being submitted to an expansion.

2. A process for the separation of the constituents of gaseous mixtures such as those containing hydrogen by liquefaction of all gases except hydrogen, in which process the vaporization of the liquefied portion or portions separated from the gaseous mixture is carried out under a pressure intermediate between the liquefaction pressure and atmospheric pressure, the gases produced by this or these vaporizations are expanded with production of external work, the cold thus produced is used for the partial liquefaction of the gaseous mixture at a temperature lower than that of the respective vaporizations and the hydrogen obtained is partially expanded without production of external work, reheated by circulation in indirect contact with the coldest part of the gaseous mixture undergoing liquefaction and then expanded with production of external work.

3. A process as claimed in claim 1, in which the expansion of the gases produced by the vaporization under pressure is effected under a temperature sufficiently low as to cause a partial liquefaction of the gases.

4. A process as claimed in claim 2 in which the expansion of the gases produced by the vaporization under pressure is effected under a temperature sufficiently low as to cause a partial liquefaction of the gases.

5. A process as claimed in claim 1 in which the gases produced by the vaporization of the said liquefied portion or portions are re-heated, for example by circulating them through a coil round the exchanger, before the expansion of the said gases is effected.

6. A process as claimed in claim 2 in which the gases produced by the vaporization of the said liquefied portion or portions are reheated, for example, by circulating them through a coil around the exchanger, before the expansion of the said gases is effected.

7. A process for the separation of the constituents of gaseous mixtures such as those containing hydrogen by liquefaction of all gases except hydrogen, which comprises vaporizing the liquefied portion or portions separated from the gaseous mixture under a pressure intermediate between the liquefaction pressure and atmospheric pressure, expanding with production of external work the gases produced by this or these vaporizations, utilizing the cold thus produced for the partial liquefaction of the gaseous mixture at a temperature lower than that of the respective vaporizations.

8. A process for the separation of the constituents of gaseous mixtures such as those containing hydrogen by liquefaction of all gases except hydrogen, which comprises vaporizing the liquefied portion or portions separated from the gaseous mixture under a pressure intermediate between the liquefaction pressure and atmospheric pressure, expanding with production of external work the gases produced by this or these vaporizations, utilizing the cold thus produced for the partial liquefaction of the gaseous mixture at a temperature lower than that of the respective vaporizations, the hydrogen obtained being expanded and then utilized for the final liquefaction of the gaseous mixture.

9. A process for the separation of the constituents of gaseous mixtures such as those containing hydrogen by liquefaction of all gases except hydrogen, which comprises vaporizing the liquefied portion or portions separated from the gaseous mixture under a pressure intermediate between the liquefaction pressure and atmospheric pressure, expanding with production of external work the gases produced by this or these vaporizations, utilizing the cold thus produced for the partial liquefaction of the gaseous mixture at a temperature lower than that of the respective vaporizations, the hydrogen obtained being partially expanded, reheated by circulation in indirect contact with the coldest part of the gaseous mixture undergoing liquefaction and then expanded with production of external work.

10. A process for the separation of the constituents of gaseous mixtures such as those containing hydrogen, which comprises vaporizing the liquefied portion or portions separated from the gaseous mixture under a pressure intermediate between the liquefaction pressure and atmospheric pressure, expanding with production of external work the gases produced by this or these vaporizations, under a temperature sufficiently low as to cause a partial liquefaction of the gases, utilizing the cold thus produced for the partial liquefaction of the gaseous mixture at a temperature lower than that of the respective vaporizations.

11. A process for the separation of the constituents of gaseous mixtures such as those containing hydrogen by partial liquefaction of all gases except hydrogen, which comprises vaporizing the liquefied portion or portions separated from the gaseous mixture under a pressure intermediate between the liquefaction pressure and atmospheric pressure, partially reheating the gases produced by this or these vaporizations by circulating them in indirect contact with the gaseous mixture before liquefaction, expanding the partially reheated gases with production of external work, utilizing the cold thus produced for the partial liquefaction of the gaseous mixture at a temperature lower than that of the respective vaporizations.

GEORGES CLAUDE.